United States Patent [19]

Yamada et al.

[11] 3,870,246

[45] Mar. 11, 1975

[54] AUTOMATIC CARTRIDGE TAPE DRAW-OUT DEVICE

[75] Inventors: Hiroshi Yamada, Ichikawa; Kenji Kojima, Tokyo, both of Japan

[73] Assignee: Kabushiki Kaisha Ricoh, Tokyo, Japan

[22] Filed: Feb. 23, 1973

[21] Appl. No.: 335,416

[30] Foreign Application Priority Data

Mar. 10, 1972 Japan .................................. 47-28216
Mar. 10, 1972 Japan .................................. 47-29853

[52] U.S. Cl. .................................. 242/192, 226/193
[51] Int. Cl. .......................... G03b 1/04, G11b 15/32
[58] Field of Search ........... 242/192, 195, 197, 200; 226/193; 65/3

[56] References Cited

UNITED STATES PATENTS

| | | | |
|---|---|---|---|
| 3,297,267 | 1/1967 | Wiggs | 242/195 |
| 3,506,419 | 4/1970 | Smith et al. | 65/3 |
| 3,704,836 | 12/1972 | Yamada | 242/192 |

FOREIGN PATENTS OR APPLICATIONS

| | | | |
|---|---|---|---|
| 26,133 | 10/1898 | Great Britain | 226/193 |

*Primary Examiner*—Leonard D. Christian
*Attorney, Agent, or Firm*—Cooper, Dunham, Clark, Griffin & Moran

[57] ABSTRACT

A reel drive roller and a tape draw-out roller larger in diameter than the reel drive roller and formed with irregularities on its peripheral surface are rotatably mounted coaxially on support means. When the support means is swung toward the opening in a cartridge, the reel drive roller engages a flange of a tape reel to rotate the tape reel to expand the outer convolutions of the wound tape radially outwardly, and the tape draw-out roller engages the outer convolutions under some pressure to feed the leading end of the tape to a capstan roller associated with a pinch roller which is formed with irregularities on its peripheral surface. The capstan roller and the pinch roller feed the tape which is drawn out in this manner to a tape take-up reel.

11 Claims, 13 Drawing Figures

AUTOMATIC CARTRIDGE TAPE DRAW-OUT DEVICE

BACKGROUND OF THE INVENTION

This invention relates to an automatic cartridge tape draw-out device.

In recent years, there has been a trend toward housing microfilm, magnetic tape, movie film and other information recording media in tape-form in cartridges in order to facilitate handling, transportation and storage thereof. With this trend, it has become necessary to solve problems involving automatic loading and automatic threading of tapes in various equipment utilizing cartridge tapes, such as microfilm readers, magnetic recording and reproducing apparatus, movie cameras, projectors and the like.

Generally, cartridge type tapes are wound on a reel which is housed in a cartridge and is completely enclosed in the cartridge. Thus, it is desirable to provide means for automatically drawing out the leading end of the tape from the cartridge, and for automatically feeding it to a take up reel.

One type of automatic cartridge tape draw-out device is illustrated in FIG. 1 and comprises a reel drive roller 602, adapted to engage with reel flanges 601*a* and 601*b*, and a tape draw-out roller 603 of a diameter larger than the diameter of the reel drive roller 602 and adapted to move between the flanges 601*a* and 601*b* to engage the tape 605. The rollers 602 and 603 are rotably mounted coaxially on a common shaft 604 to rotate as a unit. In this type of devices the tape 605 wound on the reel is gradually loosened as the reel flanges rotate in the direction of an arrow *b* as they are driven by the reel drive roller 602 rotating in the direction of an arrow *a*. The loosened tape is drawn out by centrifugal forces till a leading end 605*a* of the tape is brought into engagement with the tape draw-out roller 603. Since the reel drive roller 602 and reel draw-out roller 603 rotate at different peripheral speeds, the leading end 605*a* of the tape is withdrawn from the cartridge as indicated by an arrow *c*.

The use of such automatic cartridge tape draw-out device offers the advantage of permitting the tape to be drawn out smoothly by a simple mechanism. However, it has been found that, because the peripheral surface of the tape draw-out roller 603 is planar, the leading end 605*a* of the drawn-out tape tends to slip against the roller 603 when it is brought to a position shown in FIG. 2, thereby preventing the tape from being smoothly withdrawn from the cartridge.

After the leading end 605*a* of the tape 605 is drawn out from the cartridge, it is generally fed to a tape advance means shown in FIG. 3 as comprising a capstan roller 606 and a pinch roller 607 pressing against each other to advance the tape toward a projection section.

One of the problems raised in advancing the tape in this way is with the criticality of the angle formed by the leading end 605*a* of the tape moving toward the capstan rollers and pinch rollers 606 and 607 with the line connecting the centers of the two rollers. That is, the smaller the angle, the more difficult it becomes for the leading end of the tape to be pinched by the two rollers 606 and 607, with the result that one or more convolutions of the drawn-out tape move idly in front of the tape advance means.

When the peripheral surfaces of the two rollers 606 and 607 are planar, the path of movement of the leading end 605*a* of the tape is preferably perpendicular to the line connecting shafts 606*a* and 607*a* of the two rollers. If the angle formed by the path of movement of the leading end of the tape and the line connecting the two shafts is too acute, difficulty is experienced in having the tape pinched by the two rollers 606 and 607.

A device of the type discussed above is disclosed in U.S. Pat. No. 3,704,836 issued to the inventor in the subject patent applications and assigned to the same assignee.

SUMMARY OF THE INVENTION

An object of the invention is to provide an automatic cartridge tape draw-out device comprising a tape draw-out roller and a reel drive roller rotatably mounted coaxially on support means, with the tape draw-out roller being larger in diameter than the reel drive roller and having a peripheral surface provided with irregularities serving to ensure that the tape is smoothly and securely drawn out at all times by positively engaging the irregularities in the peripheral surface of the tape draw-out roller. An additional object is to provide a capstan roller and a pinch roller wherein at least one of the rollers is provided with surface irregularities serving to positively engage the leading end of the tape fed thereto, and to smoothly and positively feed the tape toward a take-up reel.

The present invention provides an automatic tape cartridge draw-out device which obviates the disadvantage of the prior art by the feature that irregularities are formed on the peripheral surface of the tape draw-out roller whose diameter is larger than that of the reel drive roller. The irregularities formed on the peripheral surface of the tape draw-out roller according to the invention provide the operational feature that the tape can be positively and automatically drawn out of the cartridge without difficulties of the type present with prior art devices. Even if there are differences in the size of tape rolls housed in the cartridge, the tape can positively be drawn out by virtue of the ballooning of the tape roll which occurs when the outer convolutions of the tape roll are expanded outwardly.

The device according to this invention is simple in construction, so that it lends itself for use with almost any equipment using a cartridge tape. The tape draw-out roller and reel drive roller may be formed integrally. The support means and the drive means for causing the two rollers to act on the reel and on the tape is not limited to the embodiment shown and described herein and may be of any form as desired. In the embodiment described, the cartridge reel has two flanges. It should be understood that the invention is not limited to this type of cartridge reel and that the invention is applicable to a cartridge reel having only one flange.

The automatic cartridge tape draw-out device according to this invention further includes a tape advance means comprising a capstan roller and a pinch roller wherein at least one of them is formed on its peripheral surface with irregularities which provide the operational feature that the tape can be pinched positively by the tape advance means even if the leading end of the tape moves toward the tape advance means along a path forming a sharp angle with the line connecting the two rollers.

DETAILED DESCRIPTION

The invention is described herein as used in conjunction with a microfilm projector. However, it is to be understood that this is merely one example of its use, and that the invention is applicable equally to magnetic recording and reproducing devices, movie cameras, projectors and any other equipment which utilizes an information recording medium in tape form and which is adapted to use a cartridge type tape. For example, the term "microfilm projector" used in the following description can be readily replaced by "film projector" or "tape drive."

Figure 1:
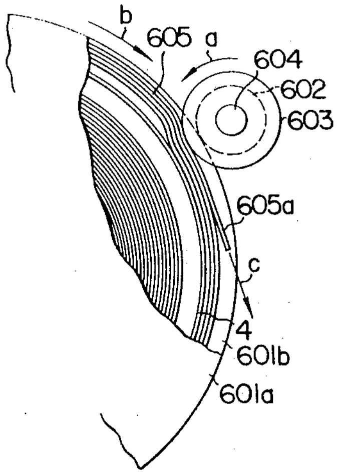
FIG. 1 PRIOR ART
FIG. 1 and FIG. 2 are fragmentary side views illustrating a prior art cartridge tape draw-out device.
Figure 2:
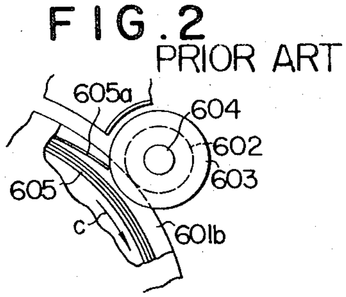
FIG. 2 PRIOR ART
Figure 3:
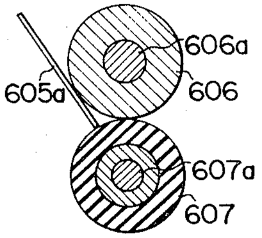
FIG. 3 PRIOR ART
FIG. 3 is a sectional side view of a prior art combination of a capstan roller and a pinch roller.
Figure 4:
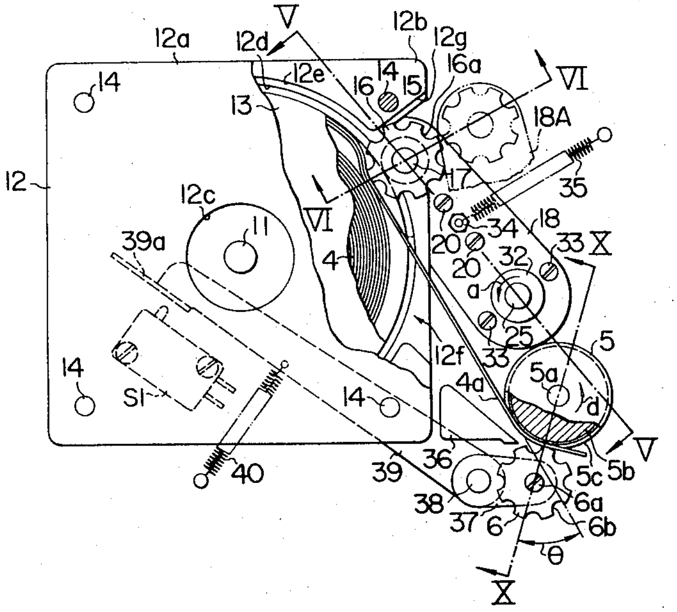
FIG. 4 is a front view of an automatic tape cartridge draw-out device comprising one embodiment of the invention, with certain portions broken away.

The microfilm projector shown in FIG. 4 comprises a microfilm supply section 1 and a projection section and a microfilm winding section (not shown) which make up, together with the supply section 1, the principal components of the projector.

A microfilm 4 supplied from supply section 1 is gripped between a capstan roller 5 and a pinch roller 6 maintained in pressing engagement with each other. Capstan roller 5 is driven by suitable drive means (not shown), so that rollers 5 and 6 are rotated to advance the microfilm 4 until it is introduced into a space between gate plates (not shown). A lens tube (not shown) having a built-in optical system for projection is disposed on one side of the gate plates, and a light source (not shown) is disposed on the other side thereof. Frames of microfilm 4 are successively projected on a screen (not shown) by the optical system for projection through a reflector, if necessary. After leaving the gate plates, the microfilm passes over an idle roller (not shown) to the winding section.

Microfilm 4 can be fed either automatically or manually, as desired, by controlling the rotation of capstan roller 5 in a manner such that the direction of rotation is switched between forward and reverse, the rate of rotation is switched between high and low, and the rotation is selectively interrupted. When a frame containing an image of the desired information is disposed at the gate plates, the microfilm is held stationary so as to project the image on the screen.

The foregoing description relates to the general construction and operation of the microfilm projector. The microfilm supply section 1, which incorporates the subject invention is described in detail below.

The microfilm supply section 1 shown in FIG. 4 comprises a film supply reel shaft 11, which is rotatably mounted in a predetermined position, and a cartridge 12, which comprises two square plates 12*a* and 12*b* of identical shape and size, each formed with an annular recess on its inner surface. Plates 12*a* and 12*b* are assembled with their inner surfaces facing each other, and are secured together by four pins 14 so as to provide therebetween an annular space for housing a reel 13. Reel 13, which is rotatably housed in the annular space, has a central portion with a mounting opening adapted to receive supply shaft 11. Cartridge 12 is formed, on opposite sides thereof, with openings 12*c* of a diameter larger than the diameter of the mounting opening of the reel, and portions 12*c* are disposed concentrically with the mounting opening in reel 13. Cartridge 12 is firmly attached to supply section 1 by fitting shaft 11 in the mounting opening of reel 13, and by fixedly securing the cartridge against rotation by suitable means (not shown).

The annular space within cartridge 12 is defined by peripheral walls 12*d* adapted to serve as a guide when the leading end of microfilm 4 wound on reel 13 is drawn out from cartridge 12 as hereinafter described. Peripheral walls 12*d* are formed with respective peripheral grooves 12*e*, so as to prevent damage to the surface of microfilm 4 by frictional dragging, which might otherwise be caused when microfilm 4 is guided by peripheral walls 12*d*. Reel 13 is mounted on shaft 11 by suitable means (not shown) in a manner such that it is detachable from this shaft but rotates as a unit therewith. Shaft 11 is connected to drive means (not shown) through a one-way clutch (not shown) of a suitable type, so that shaft 11 can be driven by the drive means only when microfilm 4 is to be rewound thereon or moved in a reverse direction. Thus, reel 13 is free to rotate in cartridge 12 when microfilm 4 is moved in the normal forward direction.

An aperture 12*f*, of relatively large angular extent and communicating with a reel chamber defined by the annular recess in cartridge 12, is formed on the right side of cartridge 12 as viewed in FIG. 4, and is oriented toward capstan roller 5. A cutout 12*g* is formed in plate 12*b* in a portion thereof disposed adjacent aperture 12*f*, and cutout 12*g* extends slightly inwardly of the periphery of the flange or flanges of reel 13 and toward the central portion thereof. This cutout has a width which is sufficiently large to permit a reel drive roller 15 or a tape draw-out roller 16 to enter thereinto when these rollers are pivoted toward cartridge 12 as described hereinafter.

Figure 5:
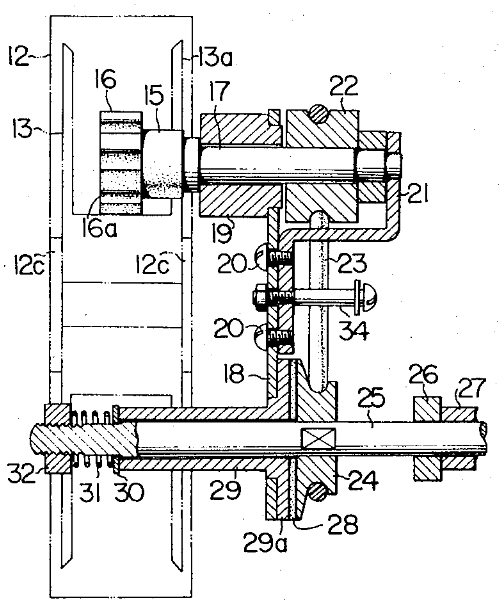
FIG. 5 is a sectional view taken along the line V—V of FIG. 4.
Figure 6:
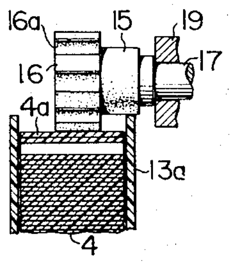
FIG. 6 is a sectional view taken along the line VI—VI of FIG. 4.

Reel drive roller 15, and tape draw-out roller 16 whose diameter is larger than that of roller 15, as best seen in FIG. 6, are positioned adjacent cutout 12*g*. Rollers 15 and 16 are constructed of a material having a high coefficient of friction, such as rubber or similar material, and mounted on a common shaft 17. Shaft 17 is rotatably supported, as shown in FIG. 5, by a bearing 19 secured to a pivotal arm 18 and a support member 21 secured to arm 18 by two screws 20.

A pulley 22 is secured on shaft 17 in a position between bearing 19 and support member 21, and is connected through an endless belt 23 to another pulley 24 secured to a drive shaft 25. Drive shaft 25 is journalled by a bearing 27 disposed to the right of a collar 26 as viewed in FIG. 5. A friction disc 28 and a sleeve 29 are loosely mounted on an outer end portion of drive shaft 25 to be disposed adjacent pulley 24. A washer 30 and a compression coil spring 31 are mounted on a minor diameter portion of the outer end of drive shaft 25, and are prevented from being dislodged from shaft 25 by a stop ring 32 threaded into the outer end of drive shaft 25. Spring 31 biases sleeve 29, through washer 30, to move toward pulley 24, so that flange 29*a* of sleeve 29 presses against an end face of pulley 24 through friction disc 28 such that pulley 24 and sleeve 29 are maintained in frictional engagement with each other.

In the illustrated embodiment, pivotal arm 18 has its base fitted over sleeve 29, the base being secured by two screws 33 to the outer end surface of flange 29*a* as shown in FIG. 4. A pin 34 is secured to arm 18 and has connected thereto one end of a tension coil spring 35 biasing arm 18 to pivot clockwise about shaft 25 as viewed in FIG. 4.

Figure 7:
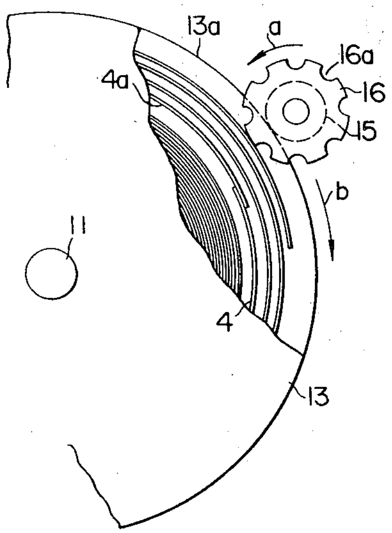
FIG. 7 and FIG. 8 are fragmentary side views showing the manner in which a cartridge tape is drawn out by the device according to the invention.
Figure 13:
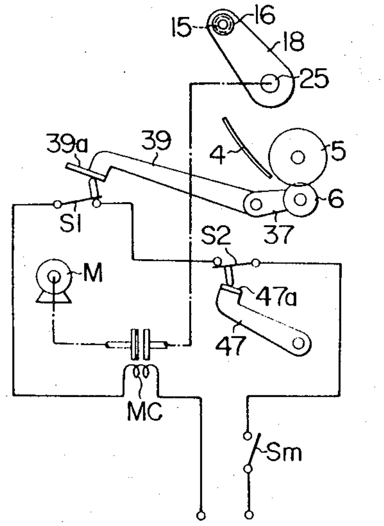
FIG. 13 is a diagram showing one embodiment of a control circuit for the automatic cartridge tape draw-out device according to the invention.

Drive shaft 25 is connected, through an electromagnetic clutch MC (see FIG. 13), to drive means, e.g., motor M and driven in the direction of an arrow *a* in FIG. 4 when clutch MC is engaged. When a main switch Sm shown in FIG. 13 is closed to energize a motor M and engage electro-magnetic clutch MC, drive shaft 25 begins to rotate in the direction of arrow *a*, and pulley 24 shown in FIG. 5 also begins to rotate with shaft 25 to rotate pulley 22 in the direction of arrow *a* in FIG. 7. Rotation of pulley 24 is transmitted through friction disc 28 to sleeve 29. As a result, pivotal arm 18 is swung in the direction of arrow *a* in FIG. 4 against the bias of spring 35 from a starting position 18A shown in dash-and-dot lines. Thereby, rollers 15 and 16 are shifted together with arm 18 and introduced into cutout 12*g* in cartridge 12, so that reel drive roller 15 is pressed against the periphery of a flange 13*a* (FIG. 6) of reel 13, and tape draw-out roller 16 is disposed in a position in which a part of its periphery is disposed between the two flanges of reel 13 as viewed in FIG. 4.

When reel drive roller 15 is positioned against the periphery of flange 13*a* of reel 13, the force which pivots arm 18 toward cartridge 12 is absorbed by the frictional connection between sleeve 29 and pulley 24. However, since drive shaft 25 still rotates, arm 18 is still biased in a counterclockwise direction and roller 15 is maintained in pressing engagement with the periphery of flange 13*a* of reel 13.

The rotation of pulley 24 is transmitted through belt 23 to pulley 22 (FIG. 5) as aforementioned, so that shaft 17 and two rollers 15 and 16 rotate counterclockwise in FIG. 4 and in the same direction as drive shaft 25. Rollers 15 and 16, which are thus shifted toward reel 13 while rotating, continue to rotate even after roller 15 is engaged with flange 13*a*. When roller 15 engages the periphery of flange 13*a*, reel 13 is driven by roller 15 and begins to rotate in a direction in which microfilm 4 is moved in a normal, or clockwise direction, as shown by an arrow *b* in FIG. 7, about reel shaft 11.

Figure 8:
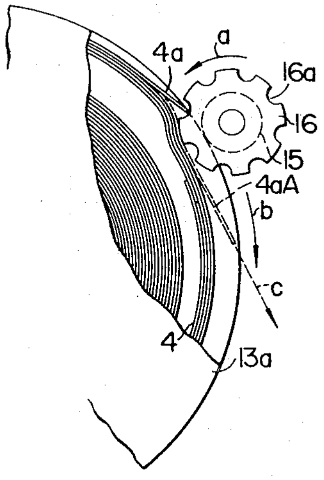

A tape leader 4a, which is usually somewhat more rigid than the microfilm 4, is connected to the leading end of microfilm 4 and wound on reel 13 along with microfilm 4, in cartridge 12. When reel 13 is rotated by drive roller 15 in the direction of arrow *b* in FIG. 7, the roll of film on reel 13 is gradually loosened and the radially outer convolutions thereof are caused to move radially outwardly by centrifugal force as reel 13 rotates. Tape leader 4*a* is gradually shifted radially outwardly toward the periphery of the flanges of reel 13. Finally, the forward end of tape leader 4*a* is brought into engagement with draw-out roller 16 and presses against the same with a pressing force of considerable magnitude as shown in FIG. 8.

As roller 16 has a diameter greater than that of roller 15, it has a higher peripheral velocity than does roller 15. Consequently, the forward end of tape leader 4*a* pressing against roller 16 is subjected to the draw-out action of roller 16, whose peripheral velocity is higher than that of the rotating reel 13. To facilitate its engaging tape leader 4*a*, roller 16 is formed on its periphery with irregularities 16*a* in the form of axially oriented elevations and depressions to permit the forward end of tape leader 4*a* to be engaged thereby. The irregularities may be in the form of a plurality of axially extending depressions or grooves 16*a* separated from each other by an alternating plurality of projections. The forward end portion of tape leader 4*a* which is brought into pressing engagement with roller 16 or which engages irregularities 16*a* thereon is positively guided, and thereafter curved along the periphery of roller 16, as shown by dash-and-dot lines 4*a* A in FIG. 8, so that the forward end thereof is detached radially and outwardly from the periphery of the roll of microfilm 4 and directed toward aperture 12*f* as indicated by an arrow *c* also in FIG. 8. In this way, microfilm 4 can be automatically drawn out of cartridge 12 by simple means positively and in a satisfactory manner. Tape leader 4*a* is intended to facilitate the draw-out of the microfilm. It will be understood that, when microfilm 4 or other tape-like medium is fairly firm or stiff, the tape leader can be eliminated.

Irregularities 16*a* on roller 16 may be in the form of a multitude of projections or cutouts in addition to the elevations and depressions shown in the figures.

With the described construction, tape leader 4*a* drawn out through aperture 12*f* of cartridge 12 is introduced, as shown in FIG. 4, into tape advance means comprising capstan roller 5 and pinch roller 6, through a guide 36 interposed between aperture 12*f* and capstan roller 5.

Figure 9:
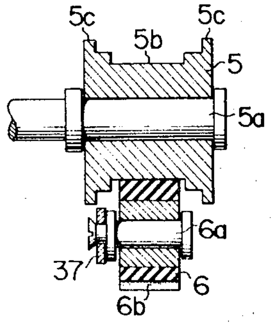
FIG. 9 is a sectional view of a capstan roller and a pinch roller constructed and operating according to the invention.

Capstan roller 5 is mounted on shaft 5*a* which is driven by drive means (not shown) to rotate in either the normal or the reverse direction or to remain stationary. Shaft 5*a* is adapted to rotate in the normal direction (the direction of an arrow *d* in FIG. 4) when the equipment is loaded with microfilm 4. A peripheral groove 5*b* having a width slightly less than the width of microfilm 4 and tape leader 4*a* is formed on the periphery of capstan roller 5, as shown in FIG. 9, and flanges 5*c* are provided on the axially opposite end surfaces of roller 5.

Figure 12:
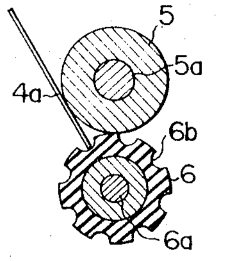
FIG. 12 is a sectional view showing the leading end of the tape moving toward the capstan roller and the pinch roller along a path forming a sharp angle with the line connecting the two rollers.

The width of pinch roller 6 is such that its periphery is received in peripheral groove 5*b* of capstan roller 5. Roller 6 is rotatably supported by a shaft 6*a* secured to an arm 37. Irregularities in the form of axially oriented elevations and depressions, or a multitude of cutouts 6*a* or projections are formed on the periphery of pinch roller 6. With the described irregularities on the periphery of pinch roller 6, tape 4 or tape leader 4*a* introduced between rollers 5 and 6 can be positively gripped by the rollers and can be pinched thereby as shown in FIG. 12, even if the path of movement of tape 4 or tape leader 4*a* is not horizontal but forms a sharp angle with the line connecting the center axes of the two rollers, as shown in FIG. 4.

In the construction described above, if pinch roller 6 is slightly biased in position toward the tape or tape leader inlet side with respect to capstan roller 5 as shown in FIG. 4, tape 4 or tape leader 4*a* can be more positively gripped by the two rollers. In this case, the angle $\theta$ formed by the path of movement of tape 4 or tape leader and the line connecting the shafts 5*a* and 6*a* together can be as follows: $0<\theta$ 90°.

Arm 37 has its base secured to a rotatable support shaft 38. As shown in FIG. 4, an arm 39 is secured to shaft 38 and has secured thereto one end of a tension spring 40 which biases arms 37 and 39 to pivot counterclockwise about shaft 38 in FIG. 4. A switch actuator 39*a* is mounted at the free end of arm 39 to face the actuator of a normally closed switch S1 shown in FIG. 13. When there is no microfilm or tape leader between capstan roller 5 and pinch roller 6, roller 6 is received in the peripheral groove 5*b* of roller 5 as shown in FIG. 9, and arm 39 maintains switch S1 closed through switch actuator 39*a*.

Figure 10:
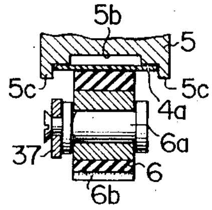
FIG. 10 is a sectional view taken along the line X—X of FIG. 4.

When tape leader 4*a* is introduced between the rotating capstan roller 5 and pinch roller 6 as shown in FIG. 4, pinch roller 6 is scooped out of peripheral groove 5*b* of roller 5 by tape leader 4*a*, and brought into a position in which it presses against tape leader 4*a*, as shown in FIG. 10. The distance covered by this movement of pinch roller 6 from the position shown in FIG. 9 to the position shown in FIG. 10 corresponds to the depth of peripheral groove 5*b*. As pinch roller 6 is thus shifted, arms 37 and 39 pivot clockwise about shaft 38, as viewed in FIG. 4, through an angle corresponding to the distance covered by the movement of pinch roller 6. Clockwise pivoting of arm 39 releases switch actuator 39*a* from engagement with switch S1, so that switch S1 is opened thereby.

Switch S1 is a switch for connecting and disconnecting electromagnetic clutch MC shown in FIG. 13 to a power source (not shown). When switch S1 is opened, electromagnetic clutch MC is disengaged and rotation of a motor M is not transmitted to drive shaft 25, which is placed in a free state. Consequently, no drive force is transmitted to pivotal arm 18 and pulley 22. As a result, rollers 15 and 16 stop rotating, and pivotal arm 18 is restored by the biasing force of spring 35 to its original position as shown by dash-and-dot lines 18A in FIG. 4. Thus, rollers 15 and 16 are released from engagement with reel 13.

After rollers 15 and 16 are released from engagement with reel 13, tape leader 4*a* and microfilm 4 following the tape leader are advanced only by capstan roller 5 and pinch roller 6. The forward end of tape leader 4*a* passes between the gate plates (not shown) and is introduced into the microfilm winding section (not shown) through an idle roller (not shown).

Figure 11:
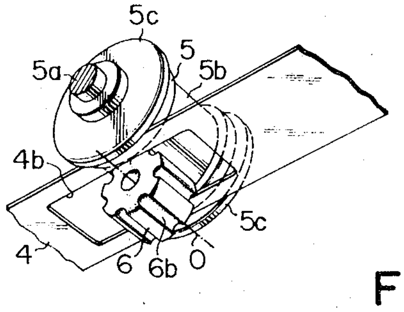
FIG. 11 is a perspective view showing an opening formed in the trailing end portion of the tape being disposed between the capstan roller and the pinch roller.

As shown in FIG. 11, a slot 4*b*, large enough to permit pinch roller 6 to pass therethrough, is formed in the trailing end portion of microfilm 4. When the trailing end portion of microfilm 4 is indexed with capstan roller 5, pinch roller 6 is received in slot 4*b*, so that capstan roller 5 and pinch roller 6 cease to advance microfilm 4. This is effective to prevent microfilm 4 from being subjected to excessive tension and damage in reel 13, or between rollers 5 and 6, when microfilm 4 is moved in the normal direction.

When pinch roller 6 passes through slot 4*b* to press against capstan roller 5, arms 37 and 39 pivot and switch S1 (FIG. 13) is closed. A normally closed switch S2 (FIG. 13) is maintained in a closed position when suitable detection means comprising an arm 47 operatively disposed with respect to the take up reel (not shown), detects that the roll of film wound on the take-up reel in the tape winding section is small in diameter. However, with an increase in the diameter of the roll of microfilm on the take-up reel, arm 47 is pivoted counterclockwise, and its end portion 47*a* opens switch S2. Switches S1 and S2 are connected, as shown in FIG. 13, in series with each other between main switch S*m* and electromagnetic clutch MC. Therefore, even if pinch roller 6 is received in the slot 4*b* in microfilm 4 and switch S1 is closed as aforementioned, electromagnetic clutch MC is not engaged after all, because switch S2 remains in an open position. This is effective to prevent rollers 15 and 16 or pivotal arm 18 from being rendered operative inadvertently when it is not required to feed microfilm 4.

Switches S1 and S2 are both closed in the initial stages of feeding of microfilm 4, so that clutch MC is engaged at once when main switch S*m* is closed. FIG. 13 illustrates schematically a circuit including switches S1 and S2 and electromagnetic clutch MC which make up the aforementioned control means. It is to be understood, however, that any other suitable circuit may be used as the control means.

We claim:

1. An automatic cartridge tape draw-out device for a tape wound on a supply reel rotatable in a cartridge and having at least one flange, comprising, in combination, a reel drive roller arranged to be rotated in pressing engagement with the periphery of a flange of the reel to rotate the reel to cause outer convolutions of the tape wound thereon to move radially outwardly; a tape draw-out roller concentric with said reel drive roller and having a diameter greater than that of said reel drive roller, said tape draw-out roller being formed on its periphery with irregularities for engaging the leading forward end of the tape on said supply reel, said tape draw-out roller being arranged to be rotated with its periphery radially inwardly of the periphery of the reel flange engaged by said reel drive roller to be in pressing engagement with the forward end of the tape when the outer tape convolutions are caused to move radially outwardly by rotation of the reel, to advance the tape from the cartridge with the forward end of the tape being maintained in abutting engagement with the irregularities on the tape draw-out roller; support means rotatably mounting said rollers and operable to move said rollers into their respective engaging positions; driving means for said rollers including a disengageable clutch; and control means controlling engagement and disengagement of said clutch to control the tape draw-out operation, wherein the irregularities formed on the periphery of the tape draw-out roller comprise means defining a plurality of axially oriented depressions in the circumferential periphery of the tape draw-out roller interspersed with a plurality of axially oriented projections from the circumferential periphery of the tape draw-out roller, said depressions and projections facilitating the engagement of the leading end of the tape with the tape draw-out roller.

2. An automatic cartridge tape draw-out device as in claim 1 comprising a tape advance means comprising a capstan roller, a pinch roller formed on its periphery with irregularities for engaging the forward end of the tape advanced from the cartridge by said tape draw-out roller and means for driving said capstan roller, means for bringing said capstan roller and said pinch roller into pressing engagement with each other, and means for guiding the tape to bring its forward end into abutting engagement with the irregularities on the periphery of the pinch roller.

3. An automatic cartridge tape draw-out device as in claim 2 wherein the irregularities formed on the periphery of the pinch roller comprise means defining a plurality of axially oriented depressions in the circumferential periphery of the pinch roller interspersed with a plurality of projections from the circumferential periphery of the roller, said alternating plurality of axially oriented depressions and projections facilitating engagement of the forward end of the tape advanced from the cartridge by said tape draw-out roller between the pinch roller and the capstan roller.

4. An automatic cartridge tape draw-out device as in claim 1 wherein the leading end of the tape on the supply reel includes a tape leader made of a material which is more rigid than the tape, said tape leader forming the forward end of said leading end of the tape on the supply reel.

5. An automatic cartridge tape draw-out device for a tape wound on a circular supply reel rotatable in a cartridge and having at least one annular flange at the radial periphery thereof, comprising, in combination, a reel drive roller, means for rotating the reel drive roller in pressing engagement of the periphery thereof with the periphery of a flange of the reel to rotate the reel for causing the outer convolutions of the tape wound thereon to move radially outwardly by centrifugal force, a tape draw-out roller concentric with and in rigid connection with said reel drive roller and having a diameter greater than that of the reel drive roller, said tape draw-out roller including means defining a plurality of irregularities on its circumferential peripheral surface for engaging the leading forward end of the tape on said supply reel by means of said irregularities, said tape draw-out roller rotating at the same angular velocity as the reel drive roller and extending radially inwardly of the periphery of the reel flange engaged by said reel drive roller to be in pressing engagement with the leading forward end of the tape on the supply reel when the outer tape convolutions thereof are caused to move radially outwardly by rotation of the reel to advance the tape from the cartridge with the forward end of the tape being maintained in engagement with at least some of the irregularities on the tape draw-out roller, and support means rotatably mounting said rollers and means for selectively moving the rollers into their respective engaging positions with the reel and with the tape wound on the reel, wherein the means defining the irregularities on the circumferential periphery of the tape draw-out roller comprise means defining a plurality of axially oriented grooves in the peripheral circumferential surface of the tape draw-out rollers, and means defining a plurality of axially extending projections interspersed with said grooves and separating said grooves.

6. A device as in claim 5 wherein the circumferential width of said grooves is greater than the thickness of the tape.

7. A device as in claim 5 including a tape advance means comprising a capstan roller, a pinch roller having means defining a plurality of irregularities on its peripheral circumferential surface, means for mounting the capstan roller and the pinch roller in pressing engagement with each other and in the path of the tape leading end advanced away from the cartridge by means of the tape draw-out roller, said irregularities of the pinch roller engaging the leading forward edge of the tape advanced thereto, and means for driving the capstan roller to engage said leading forward end of the tape between the capstan roller and the pinch roller.

8. A device as in claim 7 wherein the means defining said plurality of irregularities on the peripheral circumferential surface of the pinch roller comprise means defining a plurality of axially extending grooves in the circumferential periphery of the pinch roller and means defining a plurality of axially extending projections from the circumferential periphery of the pinch roller, said plurality of projections being interspersed with the plurality of grooves and separating adjacent grooves from each other.

9. A device as in claim 5 including tape advance means comprising a capstan roller and a pinch roller, means for mounting the capstan roller and the pinch roller in pressing engagement with each other and in the path of the tape leading end advanced away from the cartridge by means of the tape draw-out roller, at least one of said capstan roller and pinch roller having means defining a plurality of irregularities on the circumferential peripheral surface of the roller, said irregularities engaging the leading forward edge of the tape advanced thereto, and means for driving the capstan roller to engage said leading forward end of the tape between the capstan roller and the pinch roller.

10. A device as in claim 9 wherein only the pinch roller includes means defining said plurality of irregularities.

11. An automatic cartridge tape draw-out device for a tape wound on a supply reel rotatable in a cartridge and having at least one annular flange at the radial periphery thereof, comprising, in combination: a reel drive roller, means for rotating the reel drive roller in pressing engagement of the periphery thereof with the periphery of an annular flange of the supply reel to rotate the reel and to cause the outer convolutions of the tape wound on the reel to move radially outwardly by centrifugal force, a tape draw-out roller concentric with and rotating with said reel drive roller and having a diameter greater than that of the reel drive roller, said tape draw-out roller including means defining a plurality of irregularities in its circumferential peripheral surface, said irregularities including a plurality of depressions in the circumferential peripheral surface of the tape draw-out roller interspersed with a plurality of projections from the circumferential peripheral surface of the tape draw-out roller, said tape draw-out roller engaging the leading forward end of the tape on the supply reel by means of said irregularities, said tape draw-out roller rotating at the same annular velocity as the reel drive roller and extending radially inwardly of the periphery of the reel flange engaged by the reel drive roller to be in pressing engagement with the leading forward end of the tape on the supply reel when the outer tape convolutions thereof are caused to move radially outwardly by rotation of the reel, to thereby advance the tape from the cartridge, with the forward end of the tape maintained in engagement with at least some of the irregularities in the tape draw-out roller, support means rotatably mounting said rollers and means for selectively moving the rollers into their respective engaging positions with the reel and with the tape wound on the reel.

* * * * *